No. 871,285. PATENTED NOV. 19, 1907.
T. C. MARTIN.
FILTER.
APPLICATION FILED FEB. 14, 1907.
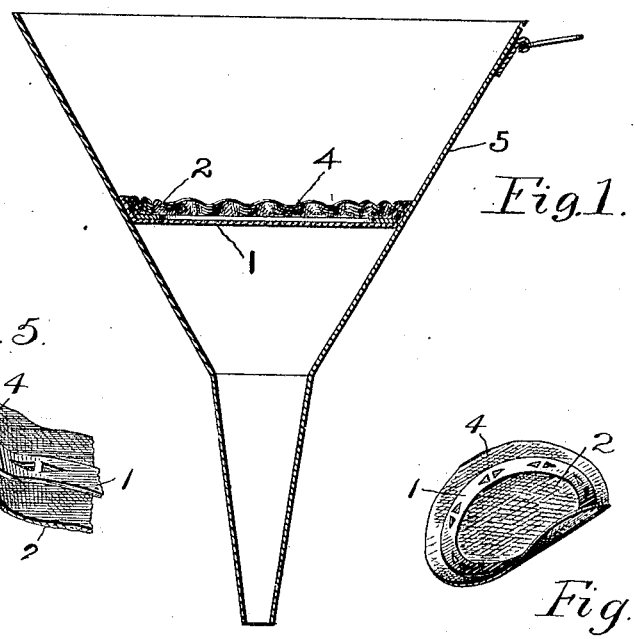
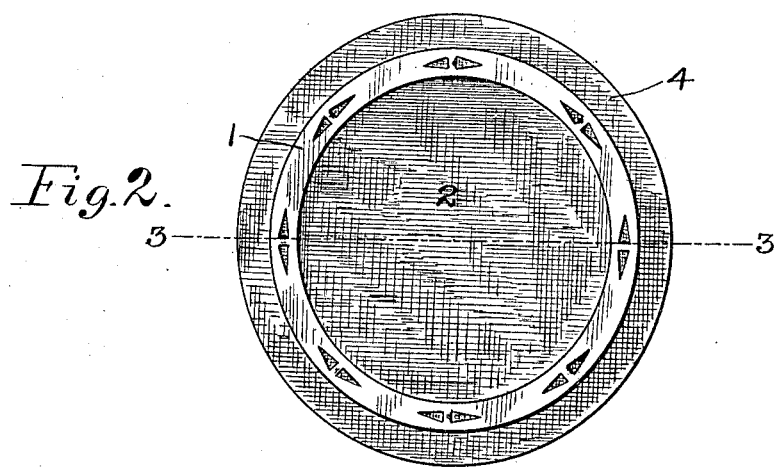
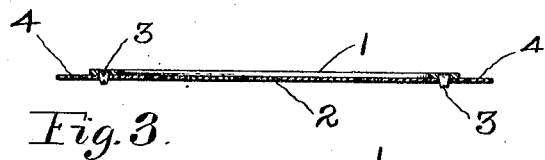
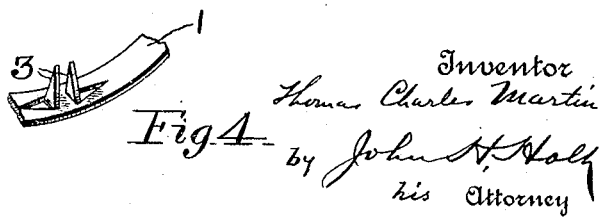
Witnesses
Jas. E. Hutchinson
W. T. Schornborn
Inventor
Thomas Charles Martin
by John H. Holt
his Attorney

UNITED STATES PATENT OFFICE.

THOMAS CHARLES MARTIN, OF CLEVELAND, OHIO.

FILTER.

No. 871,285.   Specification of Letters Patent.   Patented Nov. 19, 1907.

Application filed February 14, 1907. Serial No. 357,406.

*To all whom it may concern:*

Be it known that I, THOMAS CHARLES MARTIN, a citizen of the United States, residing at Cleveland, in the county of Cuyahoga and State of Ohio, have invented certain new and useful Improvements in Filters, of which the following is a specification.

The primary objects of this invention are to provide a filter which will occupy the smallest possible space commensurate with the requirements to be fulfilled without sacrificing filtering area, and one which may be used with almost any of the funnels generally in use in stores for pouring liquid into a vessel, these characteristics as well as others which will hereinafter appear, rendering the device especially valuable in filtering gasolene for automobiles.

A form of my invention is illustrated in the accompanying drawings, forming a part of this application, in which:

Figure 1, represents in central vertical section a funnel with said filter located therein; Fig. 2, a top plan view of said filter removed from the funnel; Fig. 3, a section on line 3—3, Fig. 2; Fig. 4, a detail fragmentary perspective view of a portion of the filter ring to show the arrangement of the stamped spurs; Fig. 5, a fragmentary perspective view to show one way of bending the filter ring to overcome an irregularity in the vessel with which the filter is used; and Fig. 6, a perspective view on a somewhat reduced scale to show another way of bending the filter ring to adapt it to a vessel of asymmetrical form.

The form of my invention herein illustrated comprises a thin flat metal ring 1, to one of the flat faces of which is permanently secured at intervals a piece of porous flexible filtering material 2, preferably chamois skin. The piece 2 extends over the space bounded by the ring and substantially straight across said space when not supporting the weight of superposed liquid. I prefer, however, that the piece 2 sag somewhat or become concave on top when the liquid is poured on it in filtering. This can be regulated of course by the manner of putting the piece 2 on the ring. If it is stretched tight such sagging is reduced. If it is placed on the ring loosely, which is preferable, the sagging may be very appreciable. The degree of this sag therefore may be varied.

The piece 2 is attached to the ring 1, in the case shown, by means of spurs 3 stamped out of the ring in pairs located at intervals around the ring. These spurs pierce the material 2, after which they are bent in opposite directions to clench the said material, thereby preventing the same from working off the ring. Any other suitable means, however, may be employed for securing the filtering material to its supporting ring.

The filtering material 2 extends beyond the outer periphery of the ring to form an annular extension or loose flap 4, which forms a packing around the outer edge of the ring when the filter is placed in a funnel or other vessel.

The ring 1 is preferably very pliable and inelastic so that it may be bent transversely to overcome irregularities in funnels or other vessels to which the filter may be applied or to accommodate the filter to various shapes of vessels. For this purpose the said ring is preferably stamped out of a thin piece of malleable iron or what is commonly known as "tin", copper or other suitable material.

When used with a funnel such for example as funnel 5, Fig. 1, the filter may be placed in the funnel as shown. The extension 4 which projects up between the ring 1 and the funnel packs the space between the ring and funnel and prevents the flow of unfiltered liquid through that space. This packing, however, does not prevent the filtering of the liquid through that space since the packing or extension is itself filtering material, thereby gaining additional filtering area. Filtering area is also gained by attaching the piece 2 to the ring 1 at intervals around the ring as contradistinguished from having the attachment continuous around the ring. This is owing to the fact that when the attachment is at intervals as in the form of filter herein illustrated, the liquid is allowed to go between the ring and the filtering material, between the points of attachment and there percolate through the said material, the weight of the liquid causing a slight sagging of the filtering material away from the ring 1 between said points of attachment.

Since the outer periphery of the ring 1 is preferably a circle, it will be readily seen that the filter may be used with funnels of various sizes. If, however, the funnel has a dent in its side, or has a seam up its side which causes a ridge inside the funnel, or if the funnel is otherwise irregularly shaped, the ring may be readily bent to overcome such irregularities. For example, if there is a seam up the side of the funnel which causes a ridge on the inside of the funnel, the filter ring may be bent, as in Fig. 5, to straddle such seam or irregularity. Moreover, if the funnel should be asymmetrical or elliptical in cross section the filter ring may be bent on opposite sides transversely as shown in Fig. 6, when the outer periphery of the filter may be made to fit the interior of the funnel. Again, the packing 4 around the outer edge of the ring will act to fill in the space around the ring which may be caused by irregularities in the shape of the funnel. Also instead of placing the filter horizontally in the funnel it may be placed obliquely therein, the packing always acting to fill in the space at the outer edge of the ring, and, as above pointed out acting also to filter such liquid as may pass between the ring and the interior of the funnel.

I do not desire to be understood as confining my invention to the specific construction illustrated and herein described, but

What I claim is:—

1. A filter, comprising an annular frame, filtering material permanently secured to said frame to form a space between the said frame and said filtering material from which space liquid to be filtered may pass through said material.

2. A filter, comprising an annular frame, flexible filtering material attached to said frame at intervals therearound to permit filtration between said points of attachment, and extending beyond the outer periphery thereof to form an annular flap.

3. A filter, comprising a pliable ring, flexible filtering material secured to said ring, said material extending over the space bounded by said ring, and beyond the outer periphery of said ring to form an annular flap.

4. A filter, comprising a ring, flexible filtering material permanently secured to said ring at intervals around the same, said material extending over the space bounded by said ring, and beyond the outer periphery of said ring to form an annular flap.

5. A filter, comprising a flat pliable metal ring having integral attaching spurs located at intervals therearound, flexible filtering material secured to said ring by means of said spurs, said material extending over the space bounded by said ring, and beyond the outer periphery of said ring to form an annular flap.

6. A filter, comprising flexible filtering material, a flat pliable metal ring having integral attaching spurs arranged in pairs disposed at intervals around said ring and piercing said material, the spurs of each pair being bent in opposite directions to retain said material on said ring.

7. A filter, comprising a pliable ring, filtering material consisting of chamois skin permanently secured to said ring at intervals therearound, said material extending over the space bounded by said ring, and beyond the outer periphery of said ring to form an annular flap.

8. A filter, comprising a thin flat malleable metal ring having integral attaching spurs arranged in pairs, disposed at intervals around said ring, filtering material consisting of a piece of chamois skin extending over the space bounded by said ring and attached to said ring by said spurs passing therethrough, the spurs of each pair being bent in opposite directions to clench the said material, and the said material extending beyond the outer periphery of said ring to form an annular flap.

9. A filter, comprising a ring, flexible filtering material permanently secured to said ring at intervals around the same, and permitted to sag away from said ring between said points of attachment, said material extending over the space bounded by said ring and beyond the outer periphery of said ring to form an annular flap.

10. A filter, comprising a thin malleable metal ring, a disk of chamois skin permanently attached to said ring at intervals around one face thereof and extending beyond the outer periphery of said ring to form an annular flap.

In testimony whereof I affix my signature in presence of two witnesses.

THOMAS CHARLES MARTIN.

Witnesses:
FRANCIS S. MAGUIRE,
KITTIE E. MONTAGUE.